May 6, 1958  H. LOEVENSTEIN  2,833,630
APPARATUS FOR LEACHING
Filed Jan. 21, 1954  2 Sheets-Sheet 2
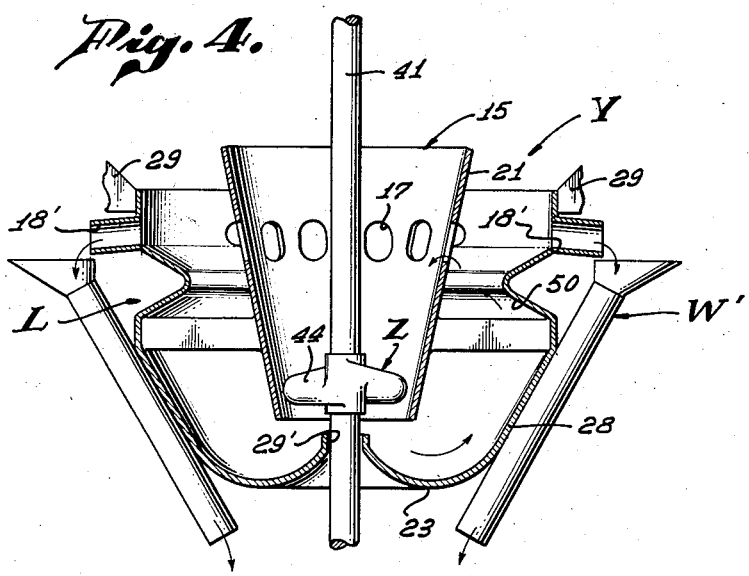
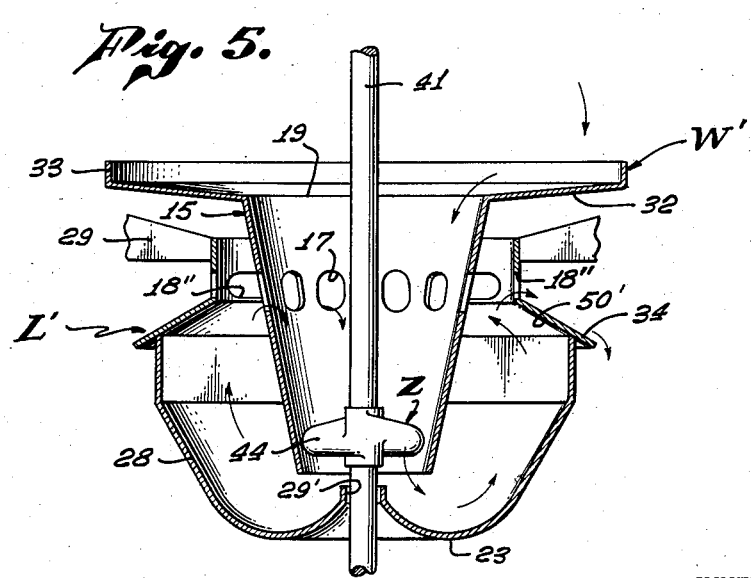
INVENTOR.
HIRSCH LOEVENSTEIN,
BY
AGENT.

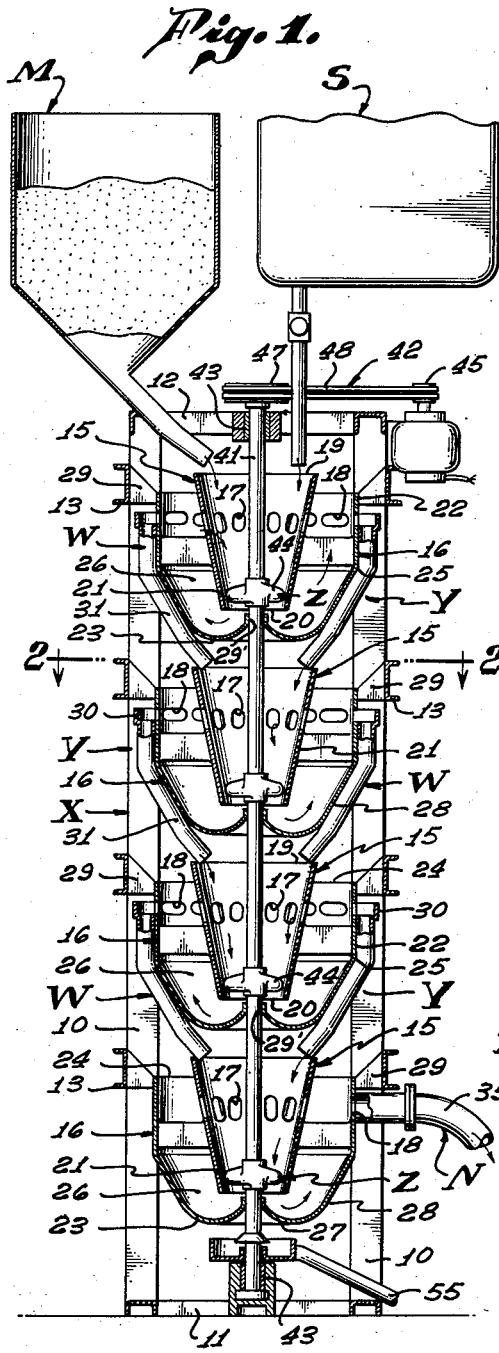
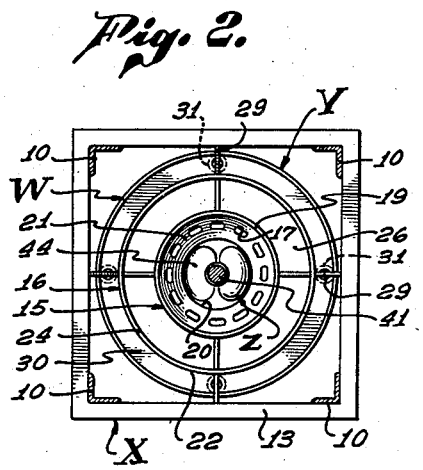
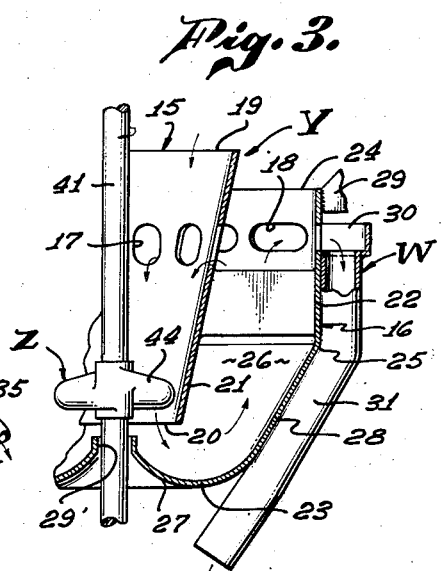

United States Patent Office 2,833,630
Patented May 6, 1958

2,833,630

APPARATUS FOR LEACHING

Hirsch Loevenstein, Los Angeles, Calif., assignor to Harvey Machine Company, Incorporated, Torrance, Calif., a corporation of California Application January 21, 1954, Serial No. 405,313

6 Claims. (Cl. 23—267)

This invention has to do with a method and apparatus for leaching or the like, and is more particularly concerned with a method and apparatus for leaching sintered or melted materials containing sodium or calcium aluminate which is to be leached with water, caustic soda or soda carbonate solutions as in the case of the production or alumina from ores which are high in silica. It is to be understood that the method and apparatus of the present invention can be used for any type of leaching or the like, and especially for the leaching of ores such as copper or zinc, etc., or for the leaching of materials such as sugar or vegetable oil, etc. The method and apparatus can also be used for the mixing of other materials, for instance, the mixing of milk with cocoa in the preparation of chocolate, or in preparing emulsions of liquids having considerable differences in their specific gravity.

In the thermic alumina processes, in which aluminates are formed, one of the important steps is the leaching of the aluminates from the sintered or melted material which issues from the furnace, with sodium carbonate solutions. This leaching is ordinarily conducted in large tanks with the aid of slow agitation. The yield of the leached material varies from one batch to another, and the material after the alumina is extracted has a tendency to become binding or to become gelatinized.

It is a main object of this invention to provide a method and apparatus for leaching which is continuous. That is, the raw material to be leached and the fresh solvent, or liquor, are introduced at one end of the apparatus and at the other end of the apparatus the pregnant solvent and the exhausted raw material are discharged. The pregnant solvent carries with it the valuable component which is desired to be extracted from the raw material being leached.

It is a general object of this present invention to provide a method and apparatus which greatly reduces the leaching time necessary for a liquor or solvent to act upon a component, such as pulverized sintered material.

It is another object of this invention to provide a method and apparatus for leaching or the like, which eliminates the need of separating the solid material from the liquid after each leaching or mixing step and, also, eliminates the need of using a fresh charge of solvent in each leaching step.

It is still another object of this invention to provide an apparatus of the character referred to in which the various steps required in the leaching of the material handled thereby are carried out with continuity so that one step follows the other without interruption.

It is still another object of this invention to provide a continuous method and apparatus of the character referred to which provides for intimate inter-mixture of the ingredients handled by the apparatus, so that they are thoroughly inter-mixed with the result that the raw material is acted upon to a very high degree by the solvents used.

It is also an object of the invention to provide an apparatus of the character referred to which handles the material and solution employed in the process of leaching, so that dead zones are avoided and so that the material flows continuously, is re-cycled, and is then discharged from the machine.

Generally speaking there are three common methods utilized in the leaching of materials. The first method is "batch" leaching in which the raw material is mixed mechanically with fresh solvent in one step. This first method has the main disadvantage of being a batch process. Another disadvantage is that at the end of the operation the leaching is done with a solvent already heavily charged with the extracted material.

To remedy this last disadvantage, the second, "co-current" method was introduced in which the leaching is divided into steps. In each of these steps only a partial leaching is accomplished, and after each step the solid material is separated from the already charged solvent and is mixed in a following step with fresh green solvent. The final yield of extraction depends on the number of steps used. The disadvantage of this second method is that the liquid must be separated from the solid material after each step and fresh solvent used.

The third, "counter-current," method eliminates the disadvantages of the two preceding methods. By this method the liquid and the solid move in different directions. But, in this case, new disadvantages appear in that the mechanical mixing must be eliminated so that the contact between solid and liquid is not completely satisfactory; and in that the constant moving of the solid and liquid in opposite directions can be accomplished only by moving the solid upwards. These factors present construction difficulties and a considerable expense for power. To overcome this, the so-called "tower" leaching was introduced. By this method a tower is charged with raw material and through this raw material the solvent, flooding the tower, is moved, generally in the upward direction. This method is only semi-continuous and does not always give satisfactory results since the liquid solvent forms channels in the solid mass. It is also a cumbersome and time-consuming operation to charge and discharge the raw material from the tower.

By the present invention I have provided an apparatus which is especially adapted for continuous leaching of raw materials and is based upon dividing the batch leaching process into steps, only a part of the leaching being performed in each step, and, without the separation of the liquid from the solid material after each step. This is accomplished by providing a number of small units whose total content is considerably less than that of a single large one, and by providing these smaller units with overflows so situated that the lower edges of the overflow holes are placed higher than the lower edges of the re-cycling holes, and by placing these apparatus at different levels so that the overflow from the higher can be directed by gravity into the draft tube of the lower.

The apparatus that I have provided preferably involves a plurality of leaching units which are positioned one over the other on a common central axis. Each unit involves a draft tube which receives material which passes therethrough to be discharged at the bottom end thereof, and a body which forms a vessel and surrounds the tube. The body is so constructed that the material discharged from the lower end of the tube is directed outwardly and upwardly. Re-circulating ports are provided at the upper end of the draft tube to allow re-entry of the material handled by the apparatus into the tube. Discharge ports are provided at the upper portion of the body, which ports determine the fluid level within the body and provide for discharging excess material from the unit. In accordance with the present invention a single circulating means is provided which is adapted to move the material handled by the apparatus. The circulating means involves a prime mover which drives a vertically disposed shaft which extends centrally of the apparatus through the units. An impeller is carried by the shaft at each unit and is in the nature of a propeller, or the like. Material discharged from the upper leaching unit is carried to the next lower leaching unit where the material is again acted upon in the same manner.

The various objects and features of my invention will be fully understood from the following detailed description of typical preferred forms of apparatus and a typical preferred manner of carrying out the method of my invention, throughout which description reference is made to the accompanying drawings, in which:

Fig. 1 is a vertical sectional view through the apparatus provided by the present invention. Fig. 2 is a sectional view taken as indicated by line 2—2 on Fig. 1. Fig. 3 is an enlarged sectional view of a portion of the structure shown in Fig. 1. Fig. 4 is a view of a modified form of the present invention showing a portion thereof, and Fig. 5 is a view similar to Fig. 4 showing a further modification of the invention.

The apparatus provided by the present invention is adapted to mix or to bring several materials into intimate contact with each other for the purpose of leaching, or the like, as hereinabove referred to. The apparatus involves, generally, a frame X, one or more leaching units Y, preferably a plurality thereof, and circulating means Z. Where a plurality of units Y is employed, they are related one above the other in spaced relationship and in a series on a common vertical axis. The circulating means Z is a single means and is adapted to provide circulation or create flow of material in the units Y.

A material supply M and a solvent supply S are provided and are adapted to handle and deliver material to the uppermost unit Y of the apparatus. The material supply M may be an ordinary hopper having a chute that directs particles of solid matter into the upper end of the apparatus. The solvent supply S may be a suitable reservoir having a supply pipe which directs the fluid solvent into the upper end of the apparatus. A delivery means N is also provided for receiving material at the lower end of the apparatus and to direct the material to other processing apparatus as circumstances require.

The frame X is an elongate vertically disposed structure and, as shown, has four equally spaced vertical columns 10 that project upwardly from a base 11 and terminate at a header 12. A plurality of spreaders 13 may be provided, that is, one spreader for each of the units Y employed. It is to be understood that the structural configuration of the frame X may be varied as circumstances require.

There is preferably a plurality of leaching units Y, and, as shown in Fig. 1 of the drawings, they are vertically disposed on a common central axis within the frame X and each involves a draft tube 15 adapted to receive material from the supplies M and S, a body 16 adapted to receive material from the tube 15, re-circulating ports 17 in the tube 15 adapted to receive material from the body 16 and direct it inwardly into the tube 15, and discharge ports 18 adapted to direct over-flow away from the unit Y. The draft tube 15 may receive the material separately or mixed as desired, and direct the material downwardly where it is received by the body 16 to be deflected and directed upwardly. The re-circulating ports 17 receive the upward flow of mixture to direct the mixture again into the tube 15. As material is added to the unit Y the level of material rises and material is therefore discharged from the unit Y through the ports 18.

The draft tube 15 is an elongate vertically disposed tubular element which is concentric with the axis of the unit Y and which is open at its top and bottom ends 19 and 20, respectively. The tube 15 is characterized by a cylindrical wall 21 which terminates at the top end 19 to open upwardly in order to receive material from the supply means M and S, or from the preceding unit Y. The wall 21 terminates at the lower end 20 which discharges into the body 16. The draft tube 15 is preferably of conical configuration and flares upwardly and outwardly from its lower end to its upper end, as clearly shown throughout the drawings. The lower end 20 is adapted to cooperate with the circulating means Z which is hereinafter described.

The body 16 is carried by a spreader 13 of the body X and is in the nature of a vessel adapted to receive and handle material delivered from the lower end 20 of the tube 15, and where the tube 15 is round in cross section the body 16 is preferably round or cylindrical in cross section. The body 16 involves, generally, a cylindrical outer wall 22 and a circular bottom 23. The wall 22 has a horizontal upper edge 24 that may extend to a heighth substantially coincidental with the upper end 19 of the tube 15, preferably somewhat lower than the upper end of the tube 15. As shown, the wall 22 has a lower edge 25 which occurs at a heighth preferably somewhat higher than the lower end 20 of the tube 15. The wall 22 is secured to the spreader 13 of the frame X by means of suitable legs 29 and the wall is spaced outwardly from the wall 21 of the tube 15 forming an annular material circulating chamber 26 which is adapted to handle upward flow of material in the body 16.

The bottom 23 of the body 16 closes the lower end of the body and is a circular element having its circumferential edge joined to the lower edge 25 of the wall 22 preferably integrally therewith, as by welding or the like. As illustrated, the bottom 23 is so shaped as to have a smooth uninterrupted material directing contour without pockets or dead spots and involves a downwardly and outwardly curved annular center section 27 and an upwardly and outwardly curved annular peripheral section 28. The sections 27 and 28 may be integrally formed of a sheet of material and act to receive downward flow of material at the center of the unit Y and direct it downwardly and outwardly and then outwardly and upwardly to the annular chamber 26. An opening 29 extends through the center of the bottom 23 to freely pass the shaft of the means Z hereinafter described.

The re-circulating ports 17 which I have provided in the draft tube 15 receive flow of material in the chamber 26 and direct it into the tube 15. There is preferably a plurality of ports 17 which may be of any suitable size and shape and are preferably elongate vertically disposed circumferentially spaced openings. The ports 17 are so proportioned and located as to extend below the material level in the body 16 and around the draft tube 15, so that the flow of material is induced into the draft tube 15.

The discharge ports 18 which I have provided in the body 16 control the material level in the body and direct excess material from the unit Y. There is preferably a plurality of ports 18 which may be of any suitable size and shape and which are preferably elongate horizontally disposed circumferentially spaced openings. The ports 18 are preferably proportioned and so located as to occur at the desired material level within the body 16. As illustrated, the ports are so related that the lower edges of the ports 18 are higher than the lower edges of the ports 17. Thus, the desired material level is maintained within the body 16 and excess material is delivered from the body to the next lower unit Y or to the delivery means N, as the case may be.

One unit Y may be employed, or a plurality of units Y may be employed in which case the units Y are arranged in spaced relationship one over the other on a common central axis. The materials to be acted upon are fed into the uppermost unit Y and are discharged from one unit to another unit to be finally discharged from the lowermost unit. As shown in Figs. 1 and 2 of the drawings, I have provided a material conducting means W which is adapted to receive material from the ports 18 and to conduct the material to the next lower unit Y. Means W involve a trough 30 that is preferably annular and surrounds the body 16 below the ports 18, and suitable material handling conduits 31 which depend from and extend downwardly and inwardly from the trough 30. Material flowing outwardly from the body 16 through the ports 18 is collected in the trough 30 and is directed downwardly and inwardly to the draft tube of the next unit Y.

In Fig. 5 of the drawings, I have illustrated a modified form W' of the material conducting means in which conduits are not required. The means W' involves a flange 32 that projects radially from the upper end 19 of the draft tube 15. A wier 33 projects upwardly at the periphery of the flange 32, and the flange 32 is declined inwardly. A material directing lip 34 projects from the periphery of the body 16 and the flange 32 and collects the material which overflows from the upper unit Y so that it is directed inwardly to the draft tube 15.

The delivery means N is adapted to receive material from the lowermost unit Y and deliver it to other processing apparatus as desired, and involves a discharge tube 35 that receives material from the lowermost unit Y and extends downwardly and away from the unit. There may be one or more discharge ports in the body 22 of the lowermost unit, preferably one port which is higher than the ports 17 and is at the material level and communicates with the tube 35.

The circulating means Z which I have provided is a single means adapted to move material through the units Y and involves, generally, a prime mover 40, a propeller shaft 41 driven by the prime mover, a coupling 42 providing driving connection between the prime mover 40 and shaft 41, bearings 43 carrying the shaft 41 and an impeller 44 at each unit Y.

The prime mover 40 may be any suitable engine or the like, and, as shown, is an electric motor which is supported by the upper end of the frame X and which is carried on a vertical axis parallel to and spaced from the central axis of the units Y.

The propeller shaft 41 may be a simple straight vertically disposed shaft concentric with the units Y and extending through the openings 29 in the bottoms 23 of the units. There are preferably two bearings 43, one carried by the header 12 and the other carried by the base 11, which bearings journal and rotatably support the shaft 41 on the central axis of the apparatus.

The coupling 42 may be any suitable means and, as shown, involves, generally, a drive pulley 45 on the motor shaft 46, a driven pulley 47 on the upper end of the shaft 41, and pulley belts 48 operatively connecting the pulleys 45 and 47. It will be understood that when the motor operates the shaft 41 will be rotated in the bearings 43.

The impellers 44 are like elements and each is in the form of a screw propeller or the like, having angularly pitched blades which are adapted to impart axial flow to the material when the impeller is rotated. The impellers 44 are spaced longitudinally of the shaft 41 and each impeller is located at the constricted lower end 20 of the draft tube 15 to which it is related, where it acts to move material from the draft tube downwardly and into the lower end of the body 16.

As shown in Figs. 4 and 5 of the drawings, I have provided means which increase the ratio of re-cycled material in relation to the overflow of material and acts to direct material flowing upwardly in the chamber 26 so that the material is directed inwardly to the vicinity of the ports 17. As shown in Fig. 4 of the drawings, the re-cycling means L is characterized by an upwardly and inwardly disposed deflecting section 50 located below the ports 18'. As shown in Fig. 5 of the drawings, the re-cyling means L' is characterized by an upwardly and inwardly disposed deflecting section 50' located below the ports 18". It will be understood how the deflecting sections 50 and 50' act to direct the flow upwardly and inwardly to the vicinity of the ports 17 so that a greater portion of the material handled by the apparatus is induced to flow into the ports 17 for re-cycling.

From the foregoing it will be apparent that I have provided a simple and practical continuously operating apparatus for the leaching of materials, such as sintered material, and which is particularly adapted for continuous operation. In accordance with the method of the present invention the raw solid material, in divided form or the like, and the liquor, or solvent, are introduced into the uppermost unit Y of the apparatus. The materials are introduced into the upper portion of the draft tube 15 and are conducted downwardly and inwardly within the side wall 21 of the tube and are acted upon by the impeller 44 at the lower end of the tube. The impeller acts upon the materials to mix them together and to move them together and to move them downwardly to discharge from the lower end 20 of the tube 15. The materials discharged from the tube 15 are then directed outwardly and upwardly through the chamber 26 where they co-mingle so that the solvent acts intimately with the raw material. The mixture which flows upwardly in the chamber 26 is directed inwardly by means L and is induced to flow back into the tube 15 through the ports 17. As the materials are added to the unit Y the material level therein rises until it reaches the level of the ports 18, whereupon a smaller ratio of the mixed material issues from or discharges from the unit Y. The material discharged from the unit Y is handled by the material conducting means W so that it is directed to the next lower unit Y to again be acted upon in a similar manner.

It is to be noted that the impellers 44 have ample working clearance within the lower portion of the tube 15 and that the shaft 41 also has ample working clearance in the opening 29 through the bottom 23. A certain amount of material may pass through the opening 29 between the bottom 23 and shaft 41, which material will pass to the next lowermost unit Y. At the base 11 of the frame X a suitable drain means 55 may be provided which is adapted to receive material which may pass through the lowermost opening through the bottom 23 of the lower unit Y. The drain means 55 may direct the material in the same manner as the means N.

Having described only typical preferred forms of apparatus and typical preferred manner of carrying out the method of my invention, I do not wish to be limited or restricted to the specific details herein set forth, but wish to reserve to myself any variations or modifications that may appear to those skilled in the art and fall within the scope of the following claims.

Having described my invention, I claim:

1. Apparatus of the character described including, a plurality of like vertically disposed leaching units on a common central axis spaced one above the other, each unit including an elongate vertically disposed draft tube with a substantially cylindrical outer wall, said tube being open at its upper and lower ends and being adapted to receive material at the upper end and to discharge it from the lower end, and a vertically disposed cylindrical body surrounding the tube, the body being closed at its lower end by a bottom and adapted to receive material from the tube and direct it from the bottom of the tube toward the upper end of the body, and means conducting material from one unit to another including a conduit depending from the upper end of the body to the upper end of the draft tube of the next lower unit, there being an opening in the bottom of the body concentric with the said central axis, and a single material circulating means for said units including, a vertically disposed shaft extending through the units through the openings in the bottoms, and an impeller on the shaft within the tube of each unit to move material downwardly therethrough.

2. Apparatus of the character described including, a plurality of like vertically disposed leaching units on a common central axis spaced one above the other, each unit including an elongate vertically disposed draft tube with a substantially cylindrical outer wall, said tube being open at its upper and lower ends and being adapted to receive material at the upper end and to discharge it from the lower end, there being ports in the wall at the receiving end of the tube, and a vertically disposed cylindrical body surrounding the tube, the body being closed at its lower end by a bottom and adapted to receive material from the tube and direct it from the bottom of the tube toward the upper end of the body, and means conducting material from one unit to another including a conduit depending from the upper end of the body to the upper end of the draft tube of the next lower unit, there being an opening in the bottom of the body concentric with the said central axis, and a single material circulating means for said units including, a vertically disposed shaft extending through the units through the openings in the bottoms, and an impeller on the shaft within the tube of each unit to move material downwardly therethrough.

3. Apparatus of the character described including, a plurality of like vertically disposed leaching units on a common central axis spaced one above the other, each unit including an elongate vertically disposed draft tube with a substantially cylindrical outer wall, said tube being open at its upper and lower ends and being adapted to receive material at the upper end and to discharge it from the lower end, and a vertically disposed cylindrical body surrounding the tube, the body being closed at its lower end by a bottom and adapted to receive material from the tube and direct it from the bottom of the tube toward the upper end of the body, and means conducting material from one unit to another including a conduit depending from the upper end of the body to the upper end of the draft tube of the next lower unit, there being an opening in the bottom of the body concentric with the said central axis, and ports in the body at the upper end thereof for discharging material from the unit, and a single material circulating means for said units including, a vertically disposed shaft extending through the units through the openings in the bottoms, and an impeller on the shaft within the tube of each unit to move material downwardly therethrough.

4. Apparatus of the character described including, a plurality of like vertically disposed leaching units on a common central axis spaced one above the other, each unit including an elongate vertically disposed draft tube with a substantially cylindrical outer wall, said tube being open at its upper and lower ends and being adapted to receive material at the upper end and to discharge it from the lower end, there being ports in the wall at the receiving end of the tube, and a vertically disposed cylindrical body surrounding the tube, the body being closed at its lower end by a bottom and adapted to receive material from the tube and direct it from the bottom of the tube toward the upper end of the body, and means conducting material from one unit to another including a conduit depending from the upper end of the body to the upper end of the draft tube of the next lower unit, there being an opening in the bottom of the body concentric with the said central axis, and ports in the body at the upper end thereof for discharging material from the unit, and a single material circulating means for said units including, a vertically disposed shaft extending through the units through the openings in the bottoms, and an impeller on the shaft within the tube of each unit to move material downwardly therethrough.

5. Apparatus of the character described including, a plurality of like vertically disposed leaching units on a common central axis spaced one above the other, each unit including an elongate vertically disposed draft tube with a substantially cylindrical outer wall, said tube being open at its upper and lower ends and being adapted to receive material at the upper end and to discharge it from the lower end, a vertically disposed cylindrical body surrounding the tube, the body being closed at its lower end by a bottom and adapted to receive material from the tube and direct it toward the upper end of the body, there being an opening in the bottom of the body concentric with the said central axis, and ports in the body at the upper end thereof for discharging material from the unit, and means conducting material from one unit to another including a trough in communication with the ports and a conduit depending from the trough to the upper end of the draft tube of the next lower unit, and a single material circulating means for said units including, a vertically disposed shaft extending through the units through the openings in the bottoms, and an impeller on the shaft within the tube of each unit.

6. Apparatus of the character described including, a plurality of like vertically disposed leaching units on a common central axis spaced one above the other, each unit including an elongate vertically disposed draft tube with a substantially cylindrical outer wall, said tube being open at its upper and lower ends and being adapted to receive material at the upper end and to discharge it from the lower end, and a vertically disposed cylindrical body surrounding the tube, the body being closed at its lower end by a bottom and adapted to receive material from the tube and direct it toward the upper end of the body, there being an opening in the bottom of the body concentric with the said central axis, and ports in the body at the upper end thereof for discharging material from the unit, and means conducting material from one unit to another including a trough in communication with the ports and a conduit depending from the trough to the upper end of the draft tube of the next lower unit, and a single material circulating means for said units including, a vertically disposed shaft extending through the units through the openings in the bottoms, and an impeller on the shaft within the tube of each unit, and means delivering material from the apparatus including a discharge tube in communication with the ports in the body of the lowermost unit.

References Cited in the file of this patent
UNITED STATES PATENTS

| | | |
|---|---|---|
| 871,300 | Schwartz | Nov. 19, 1907 |
| 1,076,666 | Dorr | Oct. 28, 1913 |
| 2,022,926 | Schlank | Dec. 3, 1935 |
| 2,458,261 | Green et al. | Jan. 4, 1949 |
| 2,664,349 | Sable | Dec. 29, 1953 |